United States Patent [19]

Ueda et al.

[11] 4,321,521
[45] Mar. 23, 1982

[54] DETECTION DEVICE OF ELECTRONIC TIMEPIECE

[75] Inventors: Makoto Ueda; Akira Torisawa; Shuji Otawa; Masaaki Mandai; Masaharu Shida; Katsuhiko Sato, all of Tokyo, Japan

[73] Assignee: Kabushiki Kaisha Daini Seikosha, Tokyo, Japan

[21] Appl. No.: 100,222

[22] Filed: Dec. 4, 1979

[30] Foreign Application Priority Data

Dec. 25, 1978 [JP] Japan .............................. 53-162170
Dec. 26, 1978 [JP] Japan .............................. 53-161509
Dec. 26, 1978 [JP] Japan .............................. 53-161510

[51] Int. Cl.³ ........................................ G05B 19/40
[52] U.S. Cl. .................................... 318/696; 318/647; 368/202; 368/204; 368/11
[58] Field of Search ................ 318/696, 685, 647; 368/202, 204, 10, 11

[56] References Cited

U.S. PATENT DOCUMENTS

| | | | |
|---|---|---|---|
| 3,756,010 | 9/1973 | Kimura et al. | 368/204 |
| 3,963,946 | 6/1976 | Zajac | 318/696 |
| 4,081,736 | 3/1978 | Leenhouts | 318/696 |
| 4,158,287 | 6/1979 | Nakajima et al. | 368/204 |
| 4,192,131 | 3/1980 | Hosokawa et al. | 318/696 |

*Primary Examiner*—J. V. Truhe
*Assistant Examiner*—Eugene S. Indyk
*Attorney, Agent, or Firm*—Robert E. Burns; Emmanuel J. Lobato; Bruce L. Adams

[57] ABSTRACT

An electronic timepiece has a stepping motor comprised of a stator, rotor and driving coil. A wave shaping circuit produces normal driving pulses and correction driving pulses having a longer pulse width than the normal driving pulses. A rotor rotation detection device detects rotation and non-rotation of the rotor after normal driving pulses are applied to the driving coil and in response to detection of a non-rotation condition, a correction driving pulse is applied to the driving coil. A magnetic field detection device detects the presence and absence of an external alternating magnetic field and in response to detection of a magnetic field, a driving pulse of longer pulse width than the correction driving pulses is applied to the driving coil to effect rotor rotation. The magnetic field detection device operates before the normal driving pulses are applied to the driving coil so that in the event of detection of a magnetic field, a driving pulse of sufficiently long pulse width will be applied to the driving coil to effect rotor rotation. In response to detection of an external alternating magnetic field by the magnetic field detection device, operation of the rotor rotation detection device is inhibited thereby conserving power and preventing mis-operation of the stepping motor.

17 Claims, 20 Drawing Figures

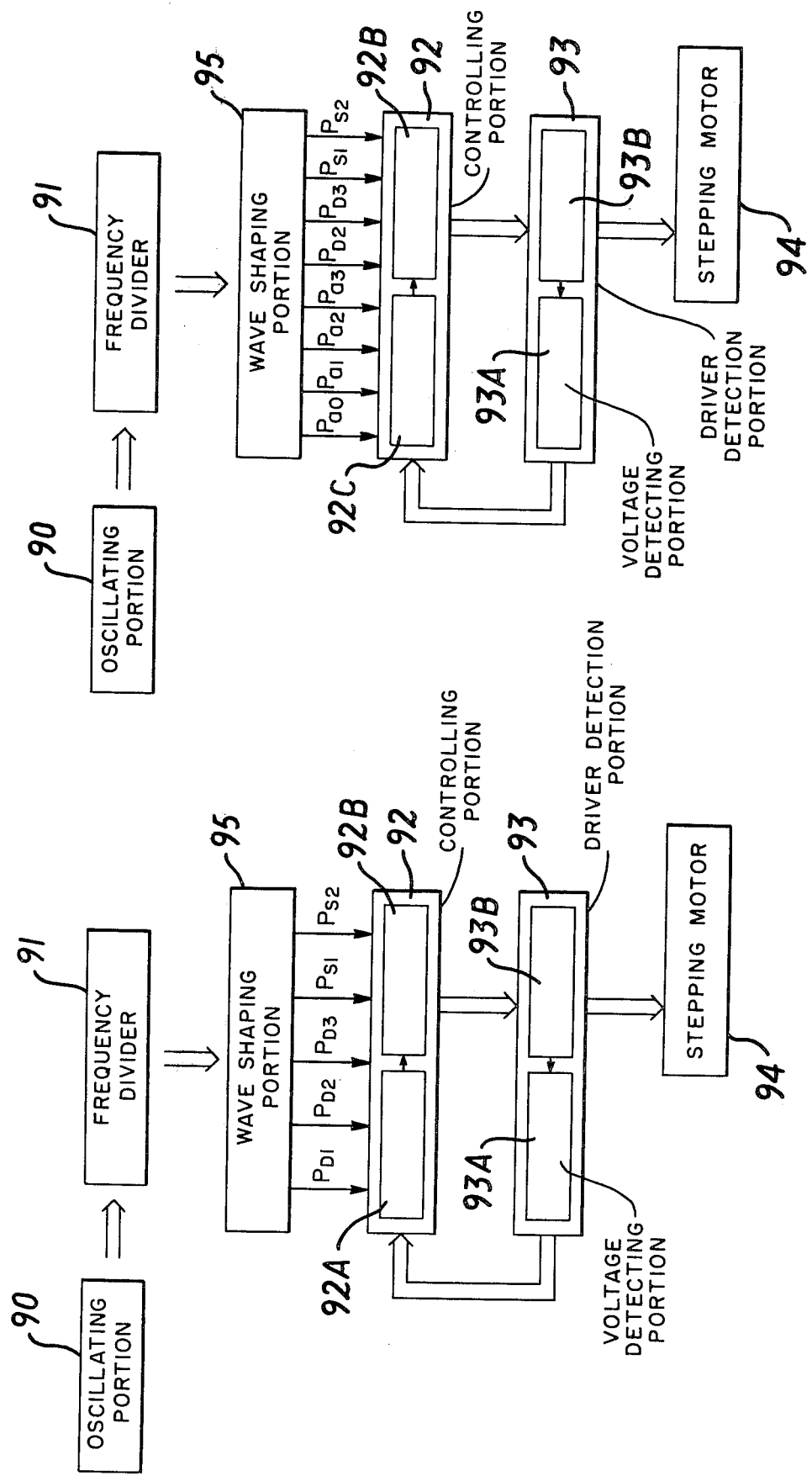

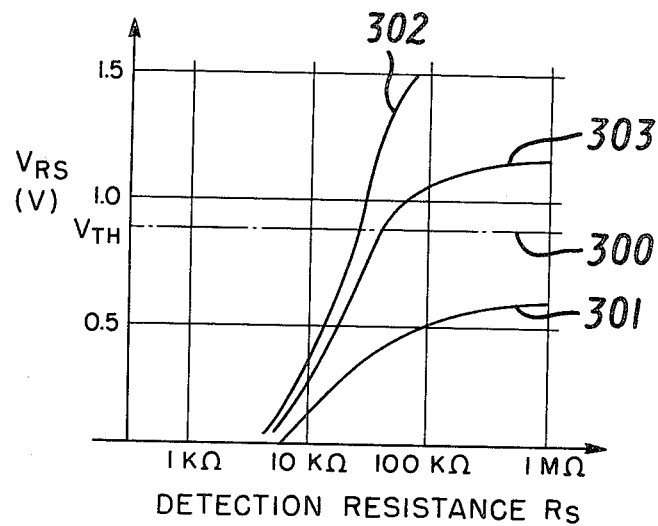
FIG. 19
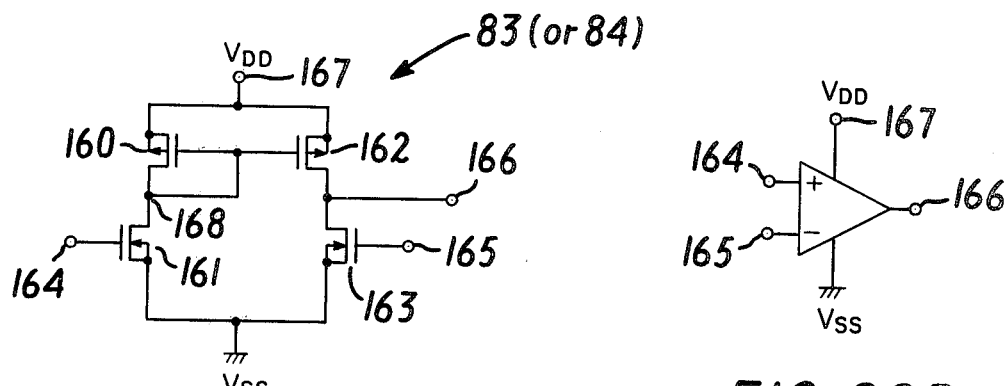
FIG. 20A
FIG. 20B
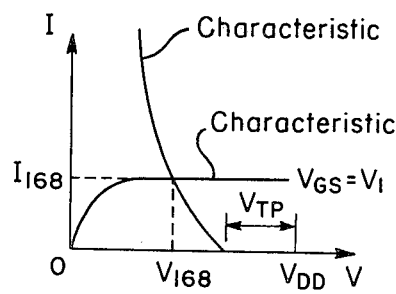
FIG. 20C
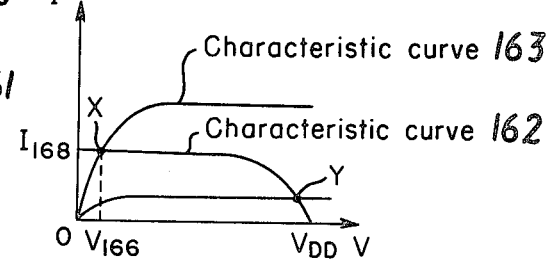
FIG. 20D

DETECTION DEVICE OF ELECTRONIC TIMEPIECE

BACKGROUND OF THE INVENTION

The present invention relates to a driving technique for a stepping motor of an electronic timepiece.

In order to operate a stepping motor with less power consumption, such as an ultra micro stepping motor of an electronic wrist watch, the so called correction driving method has been proposed. The correction driving method drives a motor with a low power consumption when the stepping motor drives normally, and drives the motor with more power consumption than usual when the motor rotor fails to rotate normally for some reason or other.

When using the correction driving method, it is important to detect rotation and non-rotation of the rotor and to assure the rotor rotation against adverse external conditions, such as the influence of external magnetic fields, in comparison with the conventional fixed pulse driving method.

FIG. 1A shows an embodiment of a bipolar stepping motor of the type used both in the conventional electronic timepiece for driving the timepiece hands as well as in the present invention, and FIG. 1B shows an example of the alternate polarity pulses conventionally used for driving the stepping motor.

By applying the driving pulse of FIG. 1B to a coil 3, a stator 1 is magnetized and a rotor 2 is rotated at 180° increments by repulsion and attraction of the stator 1 and magnetic poles of the rotor 2.

Conventionally, the length (pulse width) of the driving pulse applied to the coil 3 has been determined by selecting the width needed to assure the output of the motor under any conditions of the timepiece. In order to assure the output of the motor, it was necessary to have a long enough pulse width to accommodate a calendar load, an increase in the internal resistance of the battery which occurs at low temperatures, a reduction in the batter voltage at the last stage of battery discharge, and the like, and therefore the stepping motor must be driven with driving pulses of sufficient pulse width.

Accordingly, the following driving method of the stepping motor has been proposed. Namely, normally the stepping motor is driven by a driving pulse having a short pulse width which produces a small output, and when the stepping motor stops rotating because of a heavy load, the stepping motor is driven by a pulse having a longer pulse width which produces a sufficiently large output to drive the motor under the loaded condition.

However, it was difficult to provide particular detection elements such as a mechanical contact, a Hall effect element and the like for detecting rotation and non-rotation of the rotor since a reduction in overall timepiece size and a low cost have been required.

Accordingly, the rotation and non-rotation of the rotor have been detected by taking advantage of the feature that there is a difference in voltages induced by the vibration of the rotor between the rotor being rotated and not rotated after the driving pulse is applied.

Since the conventional method for detecting rotation and non-rotation of the rotor does not operate properly when the rotor is subjected to an alternating magnetic field, it is necessary to strengthen the sealed structure of the stepping motor as compared to the conventional type.

FIG. 2 shows a driver detection circuit of the stepping motor according to the conventional type and which can also be used for carrying out the present invention. In the circuit, inputs of N channel FET gates (referred to as N gates hereafter) $4b$, $5b$ and inputs of P channel FET gates (referred to as P gates hereafter) $4a$, $5a$ are respectively separated and the N gates $4b$, $5b$ and the P gates $4a$, $5a$ are simultaneously in the OFF state while the circuit comprises detection resistors $6a$, $6b$ for detecting rotation and non-rotation of the rotor 2 and N gates $7a$, $7b$ for switching on the detection resistors $6a$, $6b$.

FIG. 3 shows a time chart of the conventional correction driving method. When a voltage is applied across the coil, a current flows in the coil through a current passage 9 in FIG. 2 during a time interval "a" in FIG. 3.

Subsequently, during a time interval "b" in FIG. 3, a current flows in the closed loop 10 which includes the detection resistor $6b$ in FIG. 2 by a switching operation. At this time the voltage induced by vibration of the rotor 2 appears at a terminal $8b$ after the driving pulse is applied. If a non-rotation signal is detected during the time interval "b", the stepping motor is driven correctly by a driving pulse of sufficiently long pulse width to cause current to again flow through passage 9 in FIG. 2 so as to satisfy the specification of the timepiece during a time interval "c" in FIG. 3.

A description will now be given of the detection principle of rotation and non-rotation of the rotor.

FIG. 4 shows current waveforms flowing in the drive coil 3 of the stepping motor, whose coil resistance is 3 KΩ and whose number of turns is 10,000 turns. When a driving pulse of 3.9 msec pulse width is applied to coil 3, the current waveform flowing through passage 9 in FIG. 2 during the time interval "a" has almost the same waveforms regardless of rotation and non-rotation of the rotor. The time interval "b" shows the current flowing in the closed loop 10 by the voltage induced under the influence of the vibration of the rotor 2 after the driving pulse is applied, varying in a large scale under the conditions of the rotor, i.e., whether the rotor rotates or not and whether a load is connected to the motor or not. The waveform b1 during the time interval "b" in FIG. 4 shows the current waveform in the case that the rotor 2 rotates and the waveform b2 shows the current waveform in the case that the rotor 2 does not rotate. The driving detection circuit in FIG. 2 has been invented to extract the difference in currents between the rotor being rotated and not rotated as a voltage waveform. During the time interval "b" in FIG. 4, the current induced by vibration of the rotor 2 flows through the detection resistor $6b$ in the closed loop 10 and a larger voltage waveform appears at the terminal $8b$ than would be the case if the detection resistor $6b$ were not provided. Since the current flowing in the normal direction during the time interval "b" is in the reverse direction with respect to the detection resistor $6b$, a negative voltage is induced in the detection resistor $6b$.

However, when the N gates $5b$ and $7b$ are in the OFF state and ON state respectively, the N gate $5b$ is operated as a diode by using the VSS terminal side as an anode voltage since there is a P-N junction acting as the diode between the drain and P-well of N gate $5b$. Therefore the N gate $5b$ is biased in the forward direction by the voltage induced in coil 3 and being negative at the terminal 8b, forward current flows in the N gate 5b. And since the impedance is low in case the forward current flows in the N gate 5b, the rotor vibration is damped.

The relation between the operation of the rotor 2 and the detection signal will be illustrated in conjunction with FIG. 5. FIG. 5 shows the relation between the stator 1 and the rotor 2. FIG. 5A shows the rest condition of the rotor 2. The stator 1 is provided with inner peripheral notches 16a, 16b to determine the index torque and outer peripheral notches 15a, 15b to enable formation of a one-piece stator. In case of a two-piece stator, the stator is separated at 15a and 15b. Magnetic poles N and S rest at the positions of about 90° from the inner peripheral notches 16a, 16b under the rest condition of the rotor 2.

FIG. 5B shows the condition when the driving pulse is applied to the rotor, where the rotor rotates in a direction of an arrow mark 17. Since the driving pulse width is no more than 3.9 msec, the pulse is off when the N and S poles of the rotor reach in the proximity of the inner peripheral notches 16a and 16b. In case of a heavy load, the rotor cannot complete rotation and rotates in the reverse direction as shown in FIG. 5C. In this case, the magnetic poles of the rotor 2 pass in the proximity of the outer peripheral notches 15a, 15b and a large current is generated in the coil. However, since the circuit in FIG. 2 is the closed loop 10, the negative voltage is present at the terminal 8b, and the forward current flows in the N gate 5b serving as the diode, and thereby movement of the rotor 2 is damped. Accordingly the rotor 2 is decelerated rapidly and the voltage induced by the vibration of the rotor 2 is small thereafter. On the other hand, in case of a light load and the rotor continues to rotate inertia, the rotor 2 rotates in the direction of an arrow mark 19 as shown in FIG. 5D. Since the magnetic flux generated by the rotor 2 at this time is in the direction meeting at a right angle with the outer peripheral notches 15a, 15b, the induced current is small in the beginning. And the induced current becomes large when the magnetic poles rotate to positions adjacent the outer peripheral notches 15a and 15b.

At this time, since the negative voltage is present at the terminal 8b of the closed loop 10, the rotor movement is damped by the diode effect of the N gate 5b. Thereafter the rotor passes by the rest position shown in FIG. 5A and the voltage which is used to detect the rotation of the rotor 2 is present at the terminal 8b in FIG. 2 when the rotor restores to the rest position.

Numeral 20 in FIG. 6A is the voltage waveform of the terminal 8b when the rotor 2 rotates. A time interval "a" shows a period during which the driving pulse whose pulse width is 3.9 msec is applied.

The circuit in operation during the time interval "a" is the current passage 9 in FIG. 2 whose VDD=1.57 V. A time interval "b" shows the voltage waveform of the voltage induced by the vibration of the rotor in the closed loop 10 in FIG. 2. The negative voltage is clamped at about 0.5 V by the diode effect of the N gate 5b and a peak of the positive voltage is 0.4 V. The waveform 21 shows the voltage waveform of the terminal 8b when the rotor 2 does not rotate and a peak of the positive voltage is less than 0.1 V. The rotation and non-rotation of the rotor is determined by distinguishing between these two peak voltages.

Though the difference between the two peak voltages is small, the voltage can be easily amplified by the method mentioned below.

The normally open loops 10 and 11 in FIG. 2 are alternately closed during the time interval "b" in FIG. 6A. In the loop 11, since both ends of the coil 3 are shorted by the N gates 4b, 5b having an ON resistance around 100Ω, the current generated by the vibration of the rotor is large. However, when the loop 10 is switched on i.e., the loop closed), the current flows through the detection resistor 6b for an instant by an inductance constituent of the coil 3. Therefore the high peak voltage is present for an instant across the detection resistor 6b. The voltage waveform 20 at the terminal 8b induced by the rotor 2 is as shown by a voltage waveform in FIG. 6B when the normally open loops 10 and 11 in FIG. 2 are alternately closed. FIG. 6C shows the voltage waveforms 22 and 23 on an enlarged time axis. The peak voltage on this occasion delays about 30 μsec from an instant that the loop 10 is closed. The delay of the peak voltage is caused by the capacitance constituent between the drain and source of the N gate 5b. The detection signals are easily amplified several times by the above mentioned method and the rotation and non-rotation of the rotor 2 can be detected much more easily. Though the rotation and non-rotation of the rotor 2 can be detected by the above mentioned method, the detection method has a great disadvantage. Namely, when the stepping motor is subjected to an external alternating magnetic field, a voltage is induced in the coil 3 by the external magnetic field and the detection resistor mistakenly judges that the rotor rotates even when it does not. Therefore, to prevent the stepping motor from malfunctioning when placed in an alternating magnetic field, the anti-magnetic characteristic must be improved so that the pulse width of 3.9 msec drives the stepping motor normally. The alternating anti-magnetic resistance is shown by curves in FIG. 7 and is less than 3 oersteds when the pulse width is 3.9 msec.

Therefore, a very close anti-magnetic structure is required to drive the stepping motor in the correction driving circuit in order to reduce the overall size, thickness and cost of the timepiece. However the advantage of the correction driving method is not fully achieved due to the space and cost taken for the anti-magnetic structure.

On the other hand, there is another driving method which varies the normal pulse width according to the load on the motor in order to reduce the current consumption in the stepping motor even more. In this case, the rotor of the stepping motor is driven by a driving pulse having the minimum pulse width needed to rotate the rotor.

As shown in FIG. 7, at smaller pulse widths the antimagnetic characteristic deteriorates more. Accordingly, it is necessary to strengthen the anti-magnetic structure such as the sealed plate and the like. Therefore the primary object of this driving method to reduce the current in the stepping motor in order to reduce the thickness and size of the timepiece is hardly achieved.

SUMMARY OF THE INVENTION

It is an object of the present invention to provide an improved correction driving method.

It is another object of the present invention to not only prevent the deterioration of the alternating antimagnetic characteristic of the stepping motor but also to improve the anti-magnetic characteristic of the stepping motor beyond that of the conventional fixed pulse driving method while retaining the advantage of the correction driving method. Moreover, the objects of the present invention can be achieved by utilizing circuitry within the existing IC without requiring additional parts.

FIG. 8 shows a time chart showing the signal applied to the terminals 8a, 8b in FIG. 2, where "a" is a time interval for producing a normal driving pulse, "b" is a time interval for detecting rotation and non-rotation of the rotor, "c" is a time interval for producing the correction pulse when the rotor is not rotated, "b" is a time interval for vibrating the rotor when the correction pulse is produced, "d" is a time interval during which the rotor is at rest. When the voltage induced by the coil 3 is detected during the time interval "d", the stepping motor is regarded as being subject to an alternating magnetic field and the pulse width of the next driving pulse is as shown by the graph in FIG. 7. Thus the primary object of the present invention is achieved by driving the stepping motor by the pulse having the pulse width which improves the alternating anti-magnetic characteristic.

It is another object of the present invention to prevent the misdetection of rotation and non-rotation of the stepping motor when the motor is in the alternating magnetic field and to prevent the driving pulse of the same polarity from being produced two times in succession, whereby the stepping motor is driven stably in the alternating magnetic field.

Further, according to the present invention, the detection signal is easily detected by transducing the detection circuit into the voltage by use of a high impedance element. The high impedence element is formed into the IC by diffusion and is thus easily incorporated into the IC. On this occasion the diffusion resistance is composed of diffusion layers such as P−, P+ and N−. Moreover, the present invention aims to compose the voltage comparator of elements which can be easily incorporated into the IC.

Further, according to the present invention, the multiplying factor of the detection voltage is larger in case the external alternating magnetic field is detected than in case the rotation and non-rotation of the rotor is detected. The multiplying factor is made variable, without varying a constant of the detection circuit, by varying the time interval to alternately close the loop including the low impedance element and the loop including the high impedance element. Thus the present invention provides a driving method of a stepping motor which is better able to compensate for the adverse influence of the external environment than the conventional type by multiplying the detection signal for the magnetic field.

And still further it is an object of the present invention to provide a detection device of an electronic timepiece including a stepping motor having a stator, a rotor and a coil, a closed loop consisting of a low impedance element and the coil, a closed loop consisting of a high impedance element and the coil, means for alternately closing each loop, and means for detecting an external magnetic field by means of the driving coil.

BRIEF DESCRIPTION OF THE DRAWINGS

FIG. 10A is a block diagram of the electronic timepiece according to the present invention, FIG. 10B is another block diagram of the electronic timepiece according to the present invention, FIG. 19 is a correlation diagram between the detection voltage $V_{RS}$ and the detection resistance $R_S$, FIG. 20A shows a circuit structure of the voltage comparator, FIG. 20B shows a block diagram of the voltage comparator, FIG. 20C is a characteristic diagram of the current and voltage of the CMOSFETs 160 and 161, and FIG. 20D is a characteristic diagram of the current and voltage of the CMOSFETs 162 and 163.

DETAILED DESCRIPTION OF PREFERRED EMBODIMENTS OF THE INVENTION

Figure 9:
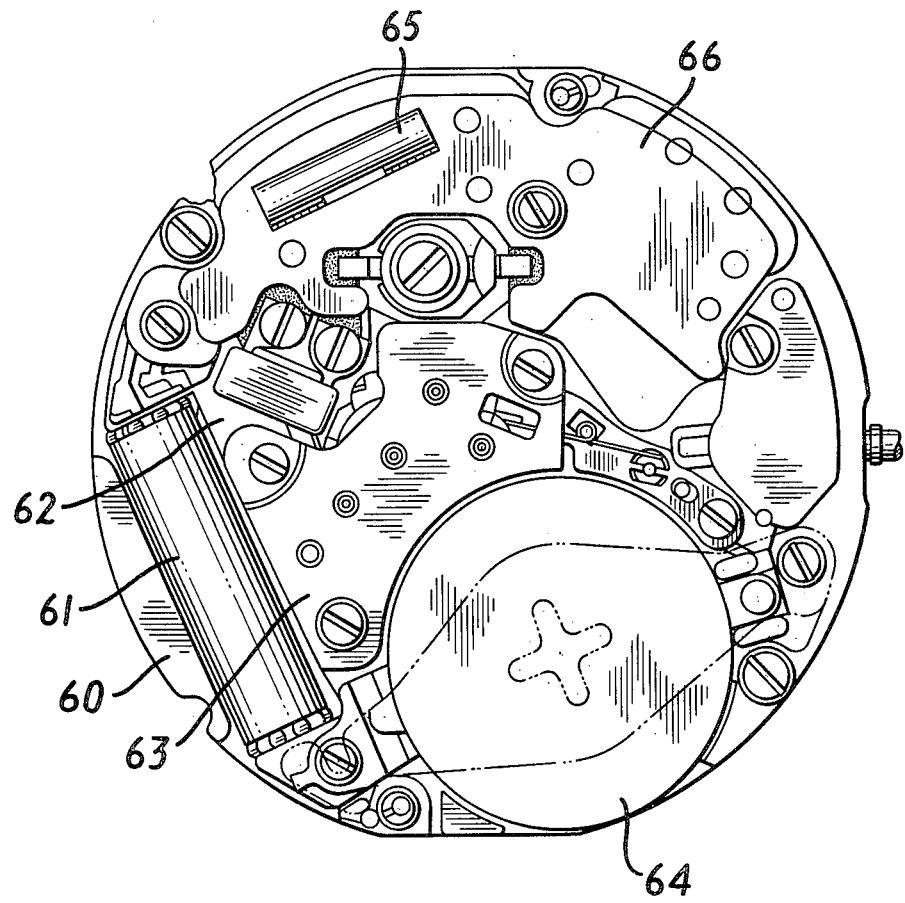
FIG. 9 shows a plan view of an electronic timepiece.

FIG. 9 shows an electronic timepiece according to the present invention comprising base plate 60, a coil block 61, 62 a stator 62, bridges 63 mounting a rotor, gear train and the like, a battery 64, a quartz crystal resonator 65, and a circuit block 66 incorporating a circuit according to the present invention and mounting an IC thereon.

FIG. 10A shows a block diagram of an electronic circuit of an electronic timepiece according to the present invention. FIG. 10B shows another block diagram of an electronic circuit of an electronic timepiece according to the present invention. An oscillating portion 90 consists of a quartz crystal resonator which generates a high frequency signal of 32768 Hz. The signal is divided into a 1 second signal by a frequency divider 91 which consists of a flipflop circuit of 15 stages. The outputs of each stage of the flipflop are fed to a wave shaping portion 95, and the driving pulse for driving the stepping motor and the timing pulse for detection are composed in the wave shaping portion 95 which is comprised of AND gate, OR gate, a flipflop circuit and the like. A driver detection portion 93 is comprised of a circuit shown in FIG. 2 and of a comparator which judges the detection signal applied to the terminals 8a and 8b. Further the driving output of the stepping motor is connected to a stepping motor 94 and at the same time the detection signal is fed back to a controlling portion 92.

The wave shaping portion 95 composes the signal necessary for the controlling portion by the signal produced from the frequency divider. The driver detection portion 93 will be described first since it is common to the embodiments (1) and (2) illustrated later.

Figure 1A:
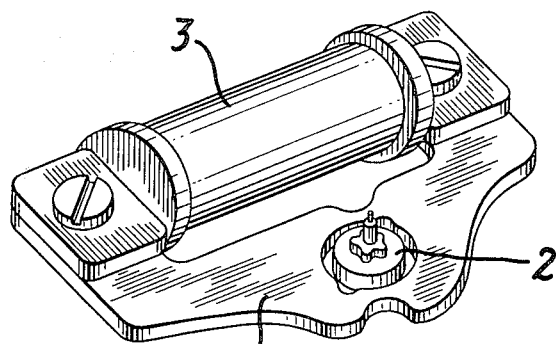
FIG. 1A is a perspective view of the stepping motor for the electronic timepiece which is used conventionally and according to the present invention.
Figure 1B:
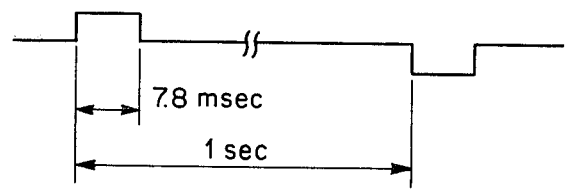
FIG. 1B is a waveform of the driving pulse of the conventional stepping motor.
Figure 2:
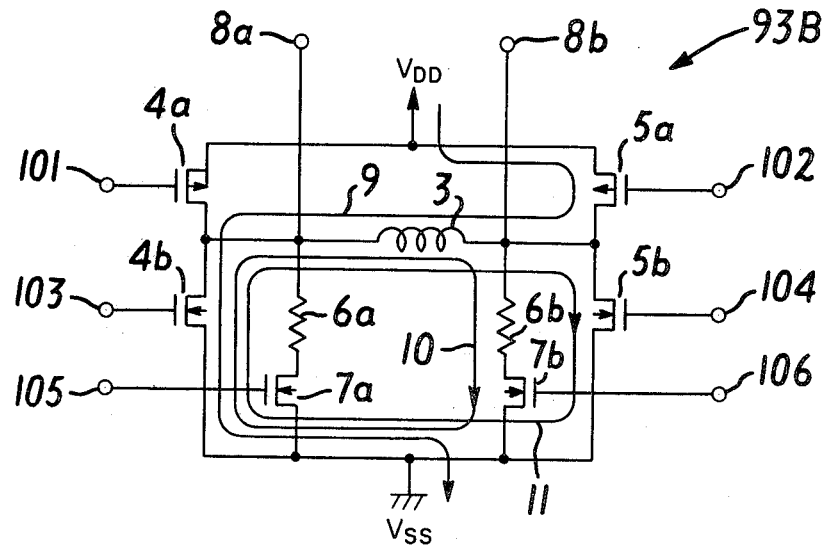
FIG. 2 is an explanatory view of the driver detection circuit according to the conventional type and the present invention.
Figure 3:
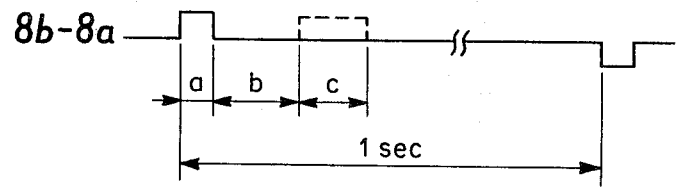
FIG. 3 is a waveform of the stepping motor driving pulse of the conventional correction driving method.
Figure 4:
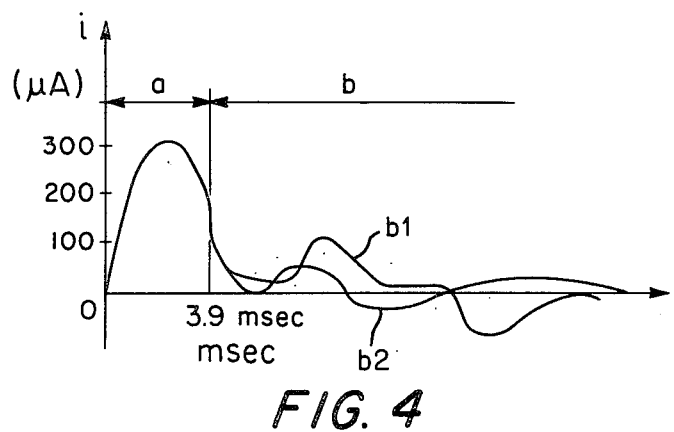
FIG. 4 shows a current waveform of the stepping motor and a current waveform of the current induced by vibration of the rotor both in case the rotor rotates and does not rotate.
Figure 5A:
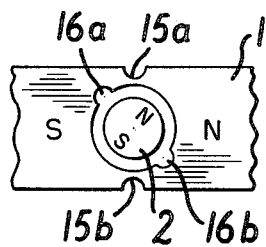
FIG. 5A shows a correlation diagram of the stator and the rotor when the rotor rests.
Figure 5B:
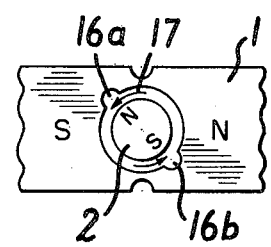
FIG. 5B shows a rotation direction of the rotor when the driving pulse is applied.
Figure 5C:
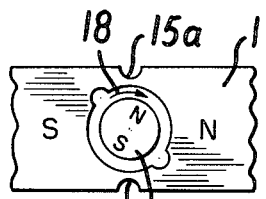
FIG. 5C shows the operation of the rotor when the rotor cannot rotate.
Figure 5D:
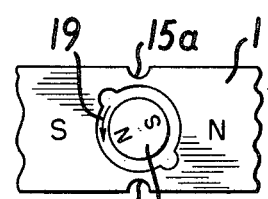
FIG. 5D shows an operation of the rotor after the driving pulse is applied when the rotor rotates.
Figure 7:
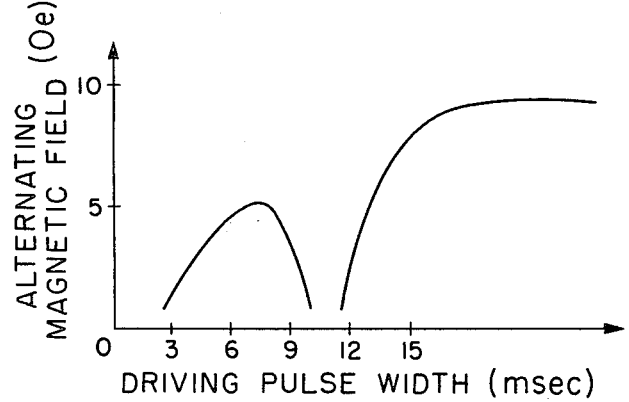
FIG. 7 shows a characteristic diagram of the pulse width and the alternating magnetic field.
Figure 8:
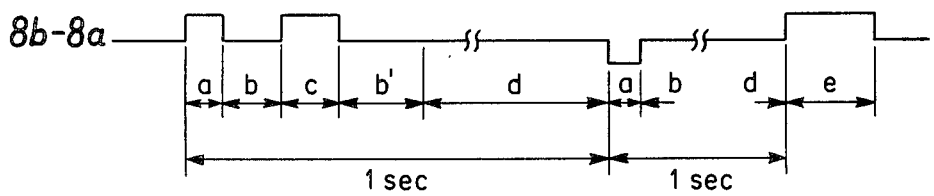
FIG. 8 shows a waveform chart of the driving pulse of the combined correction driving and magnectic field detection method according to the present invention.
Figure 11A:
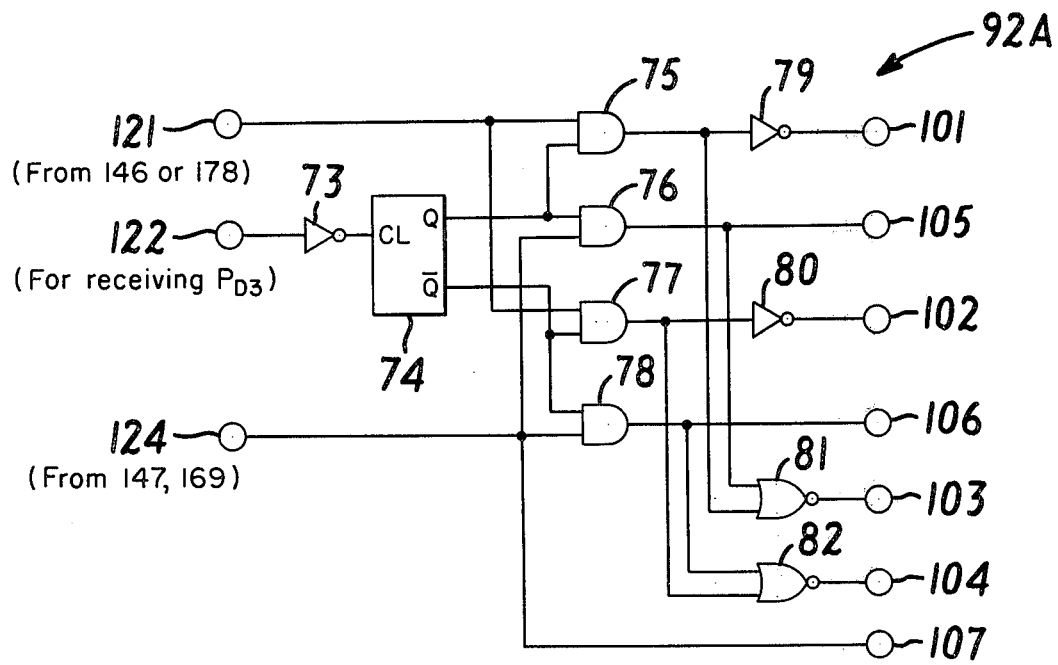
FIG. 11A is a circuit diagram of a part of the controlling portion.
Figure 11B:
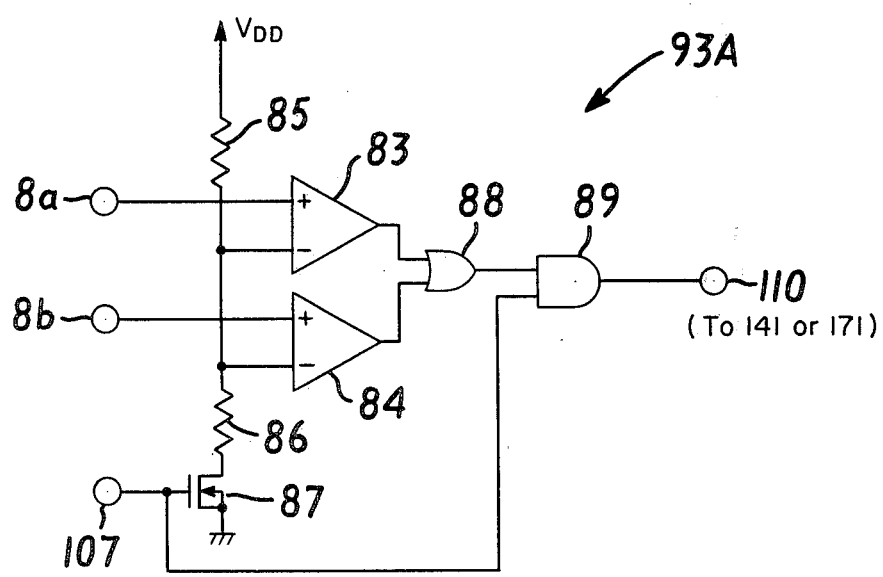
FIG. 11B is a circuit diagram of a comparator of the drive detection portion.

In FIG. 11A, output terminals 101, 102, 103, 104, 105 and 106 are connected to input terminals of the same numerals in FIG. 2 respectively and a terminal 107 is connected to the terminal 107 in FIG. 11B. An input terminal 147 in FIG. 11A controls the circuit to be the closed loop 10 in FIG. 2 at "H" (High level) and a phase controlling terminal 122 changes the condition of a flipflop (referred to as FF hereafter) 74 which controls the current direction in the stepping motor. The phase controlling terminal 122 changes the condition of FF 74 in response to the positive leading edge of the PD3 signal in FIGS. 12A and 15A. A terminal 146 serves as the current passage 9 in FIG. 2 when the "H" level signal is fed.

FF 74 is a negative edge trigger type and the signal from the phase controlling terminal 122 is fed to the clock input CL of FF 74 via an inverter (referred to as NOT hereafter) 73.

An output Q produced from FF 74 is fed to AND gates (referred to as AND hereafter) 75, 76 and an output Q produced from FF 74 is fed to AND 77 and AND 78. A driving terminal 146 is connected AND 75 and AND 77. A detection signal input terminal 147 is connected to AND 76 and AND 78. The output from AND 75 is connected to a terminal 101 via NOT 79 and fed to NOR gate (referred to as NOR hereafter) 81. The output from AND 76 is connected to the terminal 105 and NOR 81. The output from AND 77 is connected to the terminal 102 via NOT 80 and NOR 82. The outputs from NOR 81, the output from NOR 82 and the detection signal input terminal 124 are respectively connected to the terminal 103, the terminal 104 and the terminal 107.

FIG. 11B is a voltage detecting portion composing a part of the driver detection portion 93. The terminals 8a and 8b of FIG. 2 are respectively connected to the like numbered terminals in FIG. 11B. The terminal 107 in FIG. 11A is connected to the terminal 107 in FIG. 11B.

Resistors 85, 86 divide the supply voltage and the divided voltage serves as the reference signal for detecting rotation and non-rotation of the rotor and the external magnetic field. N gate 87 prevents the current from flowing in the reference voltage dividing resistors 85 and 86 other than during the detection period. Reference numerals 83, 84 denote comparators and the outputs from the comparators are at a "H" level when the voltage of the positive input is higher than the voltage of the negative input. The outputs from the comparators 83, 84 are fed to OR 88 and the output therefrom is fed to AND 89 together with the signal from the terminal 107 and the detection output is fed to a terminal 110.

EMBODIMENT 1

Figure 12A:
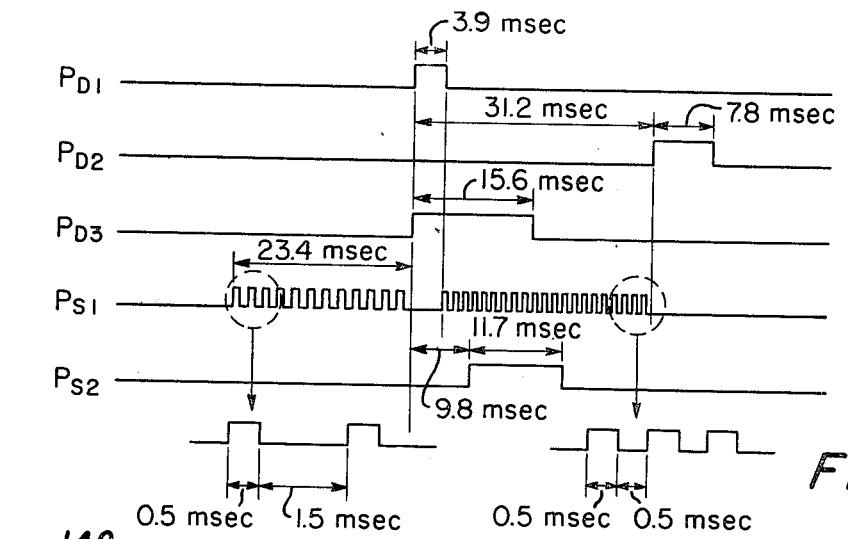
FIG. 12A is a time chart showing an embodiment of the outputs of the wave shaping portion.

FIG. 12A shows the output waveform of the wave shaping portion 95 shown in FIG. 10A. The output from the wave shaping portion 95 is fed to each of the input terminals PD1, PD2, PD3, PS1 and PS2 of the controlling portion 92B in FIG. 12B. The waveforms in FIG. 12A show the signals fed from the frequency divider and composed of a suitable combination of gate circuits such as AND, OR, NOR, NAND, NOT and the like. PD1 is a normal driving pulse having the pulse width of 3.9 msec and is produced from the wave shaping portion 95 every 1 second. PD2 is a correcting pulse having the pulse width of 7.8 msec. PD3 is a pulse having the pulse width of 15.6 msec to improve the antimagnetic characteristics when the alternating magnetic field is detected. PS1 is the pulse to detect the alternating magnetic field and amplify the rotation detection signal having the pulse width of "H"=0.5 msec and "L"=1.5 msec, i.e., H:L=1:3 for 23.4 msec prior to the PD1 pulse rise timing, and "L" remains for 3.9 msec after PD1 pulse rise timing and thereafter "H"=0.5 msec and "L"=0.5 msec, i.e., H:L=1:1. The rotation detection signal of the rotor is to be amplified by the pulse of H:L=1:1, actually, however, the rotation of the rotor is detected only for an interval that PS2 is "H" i.e., for 11.7 msec.

Figure 12B:
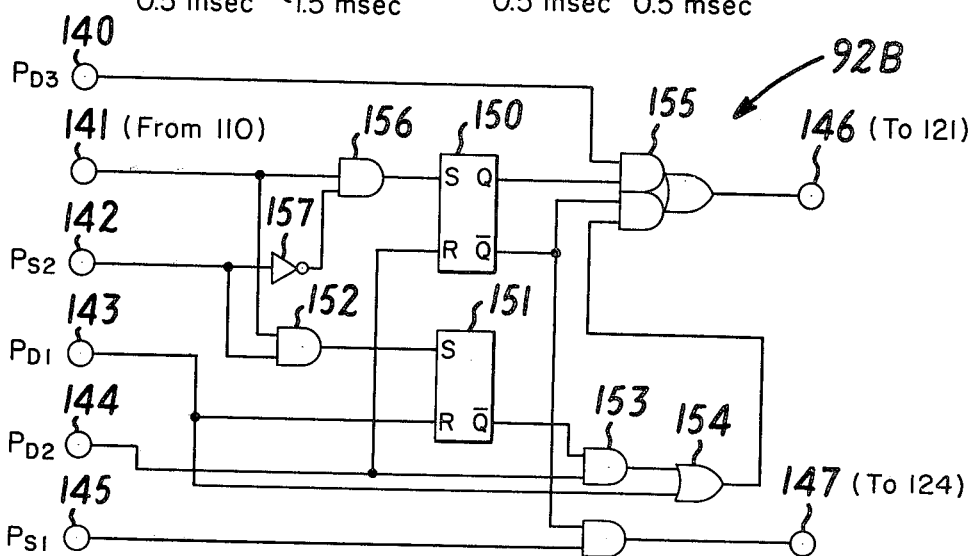
FIG. 12B is a circuit diagram showing an embodiment of the controlling portion which receives the signals in FIG. 12A.

Referring to FIG. 12B, a detection signal from the terminal 110 is fed to a terminal 141 and the detection signal is fed to S input of SR-FF 150 via AND 156 and AND 152. A signal from a terminal 142 is fed to AND 156 via NOT 157 as well as connected to an input of AND 152 and an output of AND 152 is connected to S input of SR-FF 151. A signal from a terminal 143 is connected to R input of SR-FF 151 and OR 154. An output $\overline{Q}$ of SR-FF 151 is connected to AND 153 and an output from AND 153 is fed to OR 154 and an output from OR 154 is fed to AND-OR 155. Outputs Q and $\overline{Q}$ of SR-FF 150 are connected to AND-OR 155 and an output from AND-OR 155 is connected to a driving pulse output terminal 146. An output $\overline{Q}$ of SR-FF 150 is fed to AND 157. A terminal 145 is connected to a terminal 147 via AND 157.

Since the in influence of an external alternating magnetic field does not exist in the normal operation, the output is not produced from the alternating magnetic field detection circuit, and thereby SR-FF 150 is not set. Accordingly a signal of 3.9 msec pulse width produced from PD1 is applied to the terminal 146 via OR 154. And when a rotation signal of the rotor is fed to the terminal 141, SR-FF 151 is set, and a signal PD2 of 7.8 msec pulse width is not fed to the terminal 146 since $\overline{Q}$ output of FF 151 is "L". But when the rotor does not rotate, the terminal 141 does not receive the signal, SR-FF 151 is not set and $\overline{Q}$="H". Therefore, the PD2 signal of 7.8 msec pulse width is fed to the terminal 146 via AND 153, OR 154 and AND-OR 155.

When the timepiece is subjected to an alternating magnetic field, a detection signal is fed to the terminal 141, SR-FF 150 is set, Q="H", and a signal PD3 of 15.6 msec pulse width from the terminal 140 is fed to the terminal 146 via AND-OR 155. Since the signal from the terminal 146 is fed to the input terminal 121 of the controlling circuit and the signal from the terminal 147 is fed to the terminal 124 of the controlling circuit, the stepping motor is compulsorily driven by the PD3 pulse of 15.6 msec.

EMBODIMENT 2

In the correction driving method illustrated in Embodiment 1, the pulse width of the normal driving pulse is fixed.

However, in order to reduce the power consumption of the stepping motor as compared to the method in Embodiment 1, the stepping motor can be driven by driving pulses having the minimum pulse width to be able needed to rotate the motor.

Figure 13:
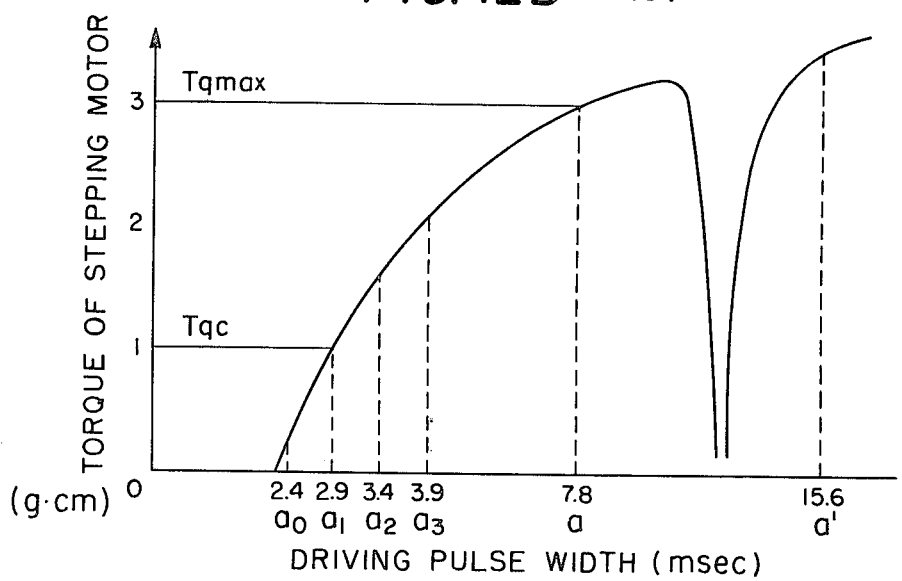
FIG. 13 is a characteristic diagram showing the relation between the driving pulse width and the minute hand torque.

FIG. 13 shows the relation between the driving pulse width and the torque of the stepping motor used in the electronic timepiece in the present embodiment.

In case of a fixed pulse driving, the driving pulse width is settled at a point in order to assure the maximum torque Tq max of the stepping motor.

In the correction driving method according to an embodiment (1), the pulse width of the normal driving pulse is settled at a2=3.4 msec or a3=3.9 msec if the point Tqc on the graph is the torque required for driving the calendar mechanism. This is because in case the rotor cannot complete the rotation by the normal driving pulse, the correction driving pulse is further added, therefore, if the correction driving pulse appears too often, the current consumption due to both the normal driving pulse and the correction driving pulse is added and as a result there is a possibility that the current consumption actually increases instead of decreasing. Acutually, however, the rotor rotates even by the pulse width of a0=2.4 msec in case of no load. Therefore the current consumption of the stepping motor can be further reduced if the stepping motor can be driven by the pulse having the pulse width of a0=2.4 msec.

Figure 14:
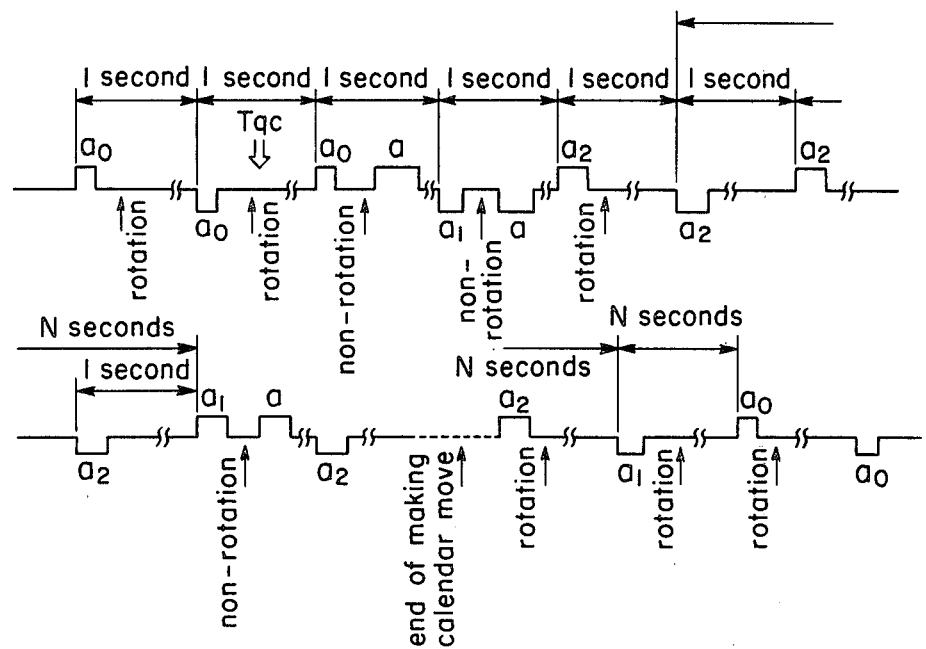
FIG. 14 is a waveform chart of the driving pulse showing the relation between the correction driving method which varies the driving pulse width according to the load variation and the detection of the alternating magnetic field in accordance with the present invention.

The embodiment (1) aims to reduce the current consumption. The operation of the stepping motor will be illustrated in conjunction with FIG. 14.

The stepping motor is normally driven by the pulse having the pulse width of a0=2.4 msec and in case the rotor cannot complete rotation by the pulse width a0 due to the calendar load, the detection circuit detects that the rotor does not rotate and the rotor is driven by the correction driving pulse. The pulse width of the correction driving pulse is a=7.8 msec in FIG. 15A generally. The driving pulse width after 1 second is automatically settled at a1=2.9 msec, the width a little longer than a0=2.4 msec, as both the normal driving pulse and the correction driving pulse were applied to the stepping motor. In the embodiment in FIG. 13, however, the rotor does not rotate since the pulse width does not reach that needed for the calendar torque Tqc even when the pulse width a1=2.9 msec, then the stepping motor is driven by the correction driving pulse of a=7.8 msec. Then the pulse width of the normal driving pulse after 1 second is automatically set at a2=3.4 msec. Since the output torque on this occasion is larger than the calendar torque Tqc, the stepping motor is driven by the pulse having the pulse width of a2=3.4 msec each second. However, in case the stepping motor is driven by the pulse having the pulse width of a2=3.4 msec even if no calendar load is present, it is disadvantageous as such does not reduce the power consumption. In order to solve the above mentioned disadvantage, a circuit to shorten the driving pulse width each N second is added. As a result, the stepping motor is driven in such a way that the pulses of a2=3.4 msec are continuously produced for N times, then the pulses of a1=2.9 msec are continuously produced, and then the pulses of a0 are continuously produced. By this driving method the conventional stepping motor can be driven with less power.

Figure 15A:
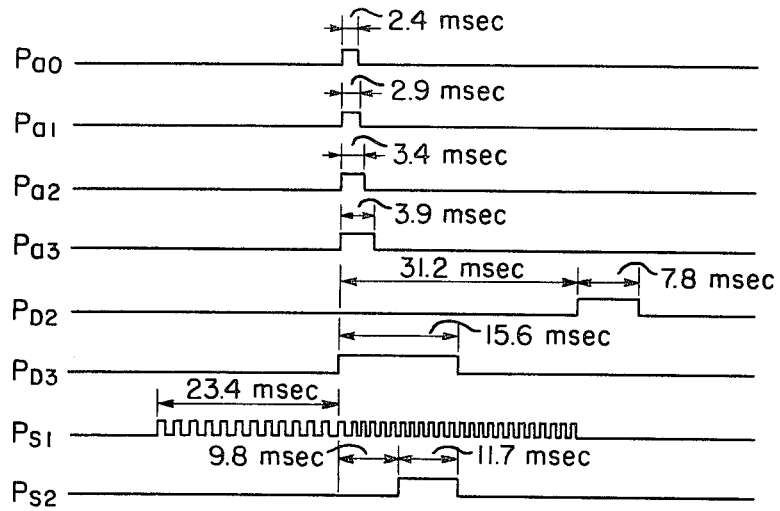
FIG. 15A is a time chart showing another embodiment of the outputs of the wave shaping portion.

FIG. 15A shows an example of the input pulses applied to the controlling portion 92 designed on the basis of the stepping motor having the characteristics shown in FIG. 13. Waveforms shown in FIG. 15A are produced from the wave shaping circiut 95 shown in FIG. 10B. The wave shaping circuit 95 which receives the signals produced from the frequency divider 91 is composed of a suitable combination of gate circuits.

One of the normal driving pulses having the pulse widths respectively Pa0=2.4 msec, Pa1=2.9 msec, Pa2=3.4 msec and Pa3=3.9 msec is automatically selected in accordance with the load connected to the stepping motor. The different pulse widths correspond to different effective powers. The selected pulse serves as the normal driving pulse PD1. PD2 is the correction driving pulse to drive the stepping motor in case the stepping motor is not rotated by PD1 and assures the maximum torque when the pulse width is 7.8 msec. PD3 is settled at the pulse width of 15.6 msec, which is the most tolerant when the detection circuit judges that the timepiece is subjected to the influence of an external magnetic field.

PS1 is an input pulse for detection. When an alternating magnetic field is detected, "L"=0.5 msec and "H"=1.5 msec, i.e., "L":"H"=1:3 and when the rotation of the rotor is detected, "L"=0.5 msec and "H"=0.5 msec, i.e., "L":"H"=1:1. PS2 is a pulse to fix the time to detect rotation and non-rotation of the rotor. PS2 starts detecting after 9.8 msec since the normal driving pulse PD1 is applied and the pulse width of PS2 is 11.7 msec.

Figure 15B:
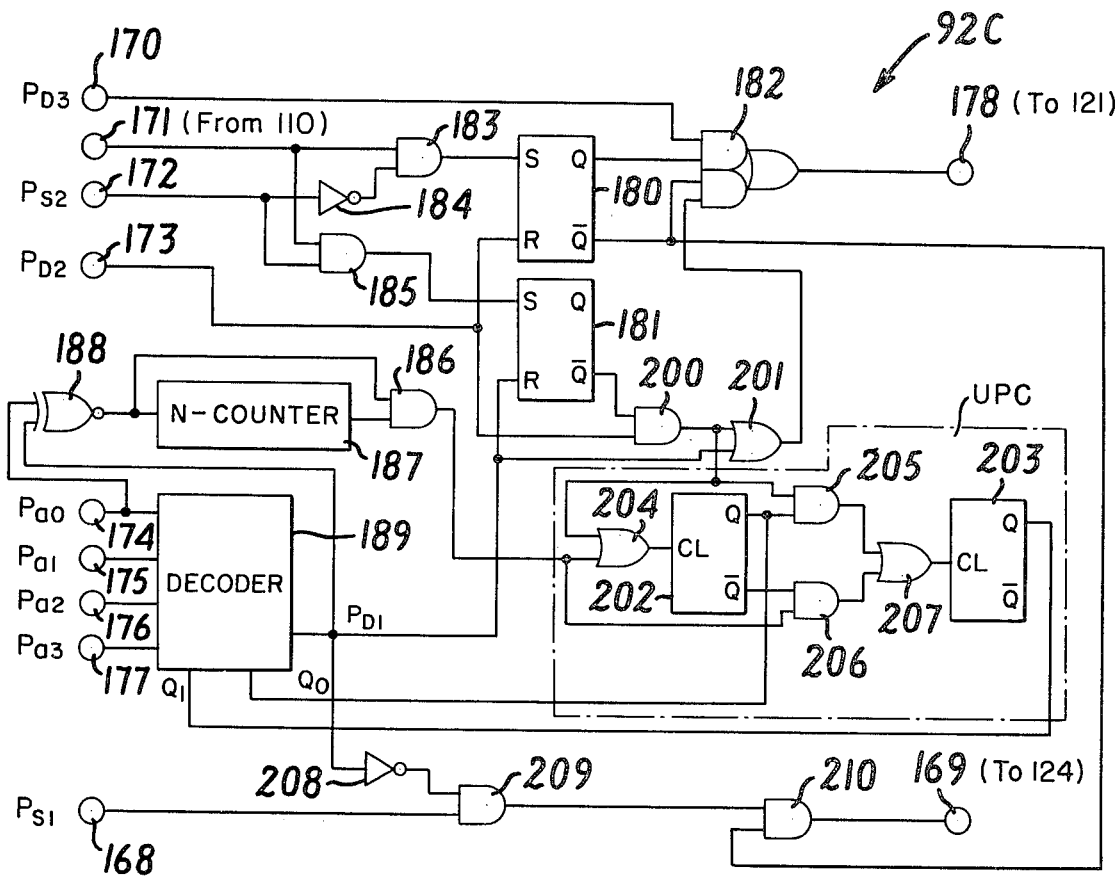
FIG. 15B is a circuit diagram showing another embodiment a part of the controlling portion which receives the signals in FIG. 15A.

The outputs from the wave shaping circuit 95 mentioned above are provided to terminals in FIG. 15B.

Pa0, Pa1, Pa2, Pa3, PD2, PD3, PS1 and PS2 are respectively applied to terminals 174, 175, 176, 177, 173, 170, 168 and 172. A detection output from the detection portion is fed to a terminal 171. Terminals 178 and 169 are respectively connected to the terminals 121 and 124 of the controlling portion 92A shown in FIG. 11A.

The construction and operation of the terminals 170, 171, 172, 173, AND 183, NOT 184, AND 185, SR-FFs 180 and 181, AND-OR 182, ANDs 200 and 201 are not illustrated since they are the same as shown in FIG. 12B. OR 204, ANDs 205, 206, OR 207, FFs 202 and 203 comprise an up-down counter UPC of 2 bits. An input from AND 200 is an up count input and an input from AND 186 is a down count input. The counter outputs from the up-down counters are the outputs Q0, Q1 from FFs 202 and 203. The outputs from the up-down counters are connected to a decoder 189 and the output PD1 from the decoder 189 is composed as shown in Table 1.

TABLE 1

| Q1 | Q0 | PD1 |
|---|---|---|
| 0 | 0 | Pa0 = 2.4msec |
| 0 | 1 | Pa1 = 2.9msec |
| 1 | 0 | Pa2 = 3.4msec |
| 1 | 1 | Pa3 = 3.9msec |

The normal driving pulse PD1 produced from the decoder 189 is the same as the normal driving pulse PD1 illustrated in FIG. 12B and is fed to OR 201 and RS-FF 181. The normal driving pulse PD1 is fed to AND 209 via NOT 208 in order to prevent the detection signal from feeding into the controlling portion 92C when the stepping motor is driven by the normal driving pulse PD1. Therefore the output PS1 does not appear at the terminal 169 when the normal driving pulse is applied. Since the output $\overline{Q}$ of FF 180 is connected to the input of AND 210, the output from AND 210 becomes "L" when the magnetic field is detected. Pa0 having the pulse width 2.4 msec and the normal driving pulse PD1 are fed to an exclusive NOR 188. Therefore an input to N-counter 187 is prohibited when PD1=Pa0 and N-counter 187 counts each second when PD1≠Pa0. The output from N-counter 187 finishes counting N and the signal synchronized with PD1 is fed to OR 204, and thereby the up-down counter UPC is counted down.

When the rotor does not rotate, PD2 is fed to AND 200 and the up-down counter UPC is counted up. Therefore the pulse width of PD1 varies in a manner that Pa0→Pa1, Pa1→Pa2, and Pa2→Pa3.

In the above mentioned embodiments, the closed loops after applying the driving pulse are switched in order to amplify the detection signal for detecting rotation and non-rotation of the rotor 2 and to amplify the voltage induced in the coil by the external alternating magnetic field. Therefore, it is necessary to detect the alternating magnetic field at the anti-magnetic characteristic level of the normal driving pulse PD1. Accordingly it is necessary to enhance the detection sensitivity level of the external alternating magnetic field detection.

While in the present embodiment, if the external magnetic field is detected in the time interval for detecting the magnetic field, the detection of the magnetic field, rotation and non-rotation of the rotor is stepped immediately and the stepping motor is driven by the pulse having the predetermined pulse width.

If the rotation and non-rotation of the rotor is detected furthermore after the magnetic field is detected, there is a possibility that rotation and non-rotation will be misdetected. The misdetection means that the detection circuit judges that the rotor does not rotate although the rotor rotates, influenced by the external magnetic field. In case rotation and non-rotation of the rotor is misdetected, the correction driving pulse having a polarity effective to drive the motor in the same direction as the driving pulse is applied to the stepping motor although the stepping motor is driven by the driving pulse resistant to the magnetic field.

However, there is the drawback that the rotor rotates 360° by applying the driving pulse in the same direction while the rotor is vibrating. Therefore the stepping motor stably rotates and gains by two seconds in the case of a timpiece which undergoes 1 second stepping since the stepping motor rotates two steps in excess.

On the contrary, according to the present invention, the detection operation is immediately stopped when the magnetic field is detected during the detecting operation, and the stepping motor is driven by the driving pulse resistant to the magnetic field.

As a result the misdetection as mentioned above is corrected and the stepping motor is stably driven notwithstanding the external alternating magnetic field and the power consumption of the electronic timepiece is reduced. Thus, according to the present invention, the manufacturing cost is not increased and the stepping motor conventionally used is driven stably with a low power consumption.

Also, in order to enhance the sensitivity for detecting the external alternating magnetic field as compared to the sensitivity for detecting the rotation and non-rotation of the rotor, advantage is taken of the following fact:

Namely, the ratio of the period of time in which the loop including the detection resistor is closed and the period of time in which the loop including the low resistance is closed are different in the case where the rotation of the rotor is detected and in the case where the magnetic field is detected.

The multiplying principle of the signal by alternately closing the loops 10 and 11 will now be described.

Figure 16A:
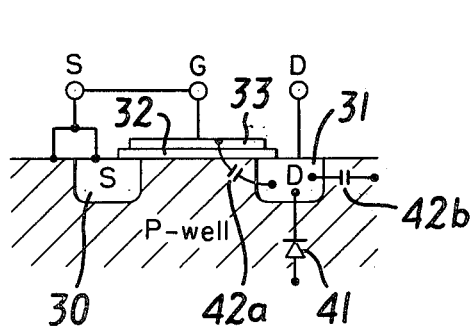
FIG. 16A is a sectional view of the N channel transistor.

FIG. 16A shows a sectional view of the N channel transistor for driving shown in FIG. 2. A P-well region is formed on a substrate and a drain 31 and a source 30 are formed in the P-well and the source 30 is connected to the P-well. Further a gate 33 is formed on the substrate by way of a silicon oxide film 32.

If the electric potential of the gate 33 of the transistor is equal to the electric potential of the source, the source and drain are switched off. At this time a parasitic diode 41 and a parasitic capacitor 42b exist between the drain and the P-well by the PN junction. On the other hand, a parasitic capacitor 42a exists between the drain 31 and the gate 33. As a result the equivalent circuit of the N gate is as shown in FIG. 16B.

Namely the diode 41 and the capacitor 42 are connected in parallel between the drain 31 and the source 31. Numeral 39 denotes the ON resistance of the transistor and numeral 40 is a gate.

Figure 16B:
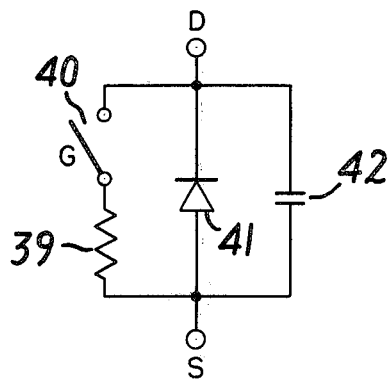
FIG. 16B is an equivalent circuit diagram of the N channel transistor in the OFF state.
Figure 17:
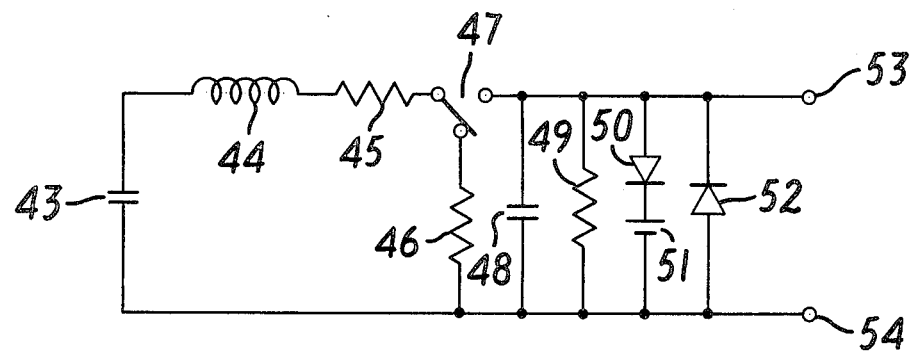
FIG. 17 is an equivalent circuit diagram in case the loop including the low resistance and the loop including the high resistance are closed alternately.

FIG. 17 shows the equivalent circuit closed by the loops 10 and 11 in FIG. 2 by the equivalent circuit in FIG. 16B.

The equivalent circuit comprises a voltage 43 ($V_O$) developed by the vibration of the rotor or developed by the external alternating magnetic field, a motor driving coil 44 having an inductance of L henry, an internal resistance 45 of the coil r, a loop change-over switch 47, and an ON resistance 46 of the N gate of about 10Ω normally, which is negligible since the value is small in comparison with the DC resistance of the coil.

The circuit includes a capacitor 48 having a capacitance equal to the sum of the parasitic capacitance of the N gate and the P gate 22, which is c farad, a detection resistor 49 having a resistance RΩ, parasitic diodes 50 and 52 between the substrate and the drain of the N gate and P gate, and a silver battery 51 for supplying power to the timepiece and having a voltage $V_D = 1.57$ V.

The voltage produced from the terminal 53 is the detection voltage $V_{RC}$ and is fed to the voltage detection element.

The response of the change-over switch 47 changed over according to the equivalent circuit in FIG. 17 is theoretically calculated as follows:

If $a = \frac{1}{2}\left(\frac{r}{L} + \frac{1}{CR}\right)$, $b = \frac{r+R}{LCR}$ $E = \frac{R}{R+r} V_0$, $\omega = \sqrt{|a^2 - b|}$, $D = 1 - \exp\left(-\frac{r}{L} t_0\right)$ when $a^2 > b$ $$V_{RS} = E\left[1 - \left\{\frac{1}{\omega}\left(a - \frac{DL}{r} b\right)\sinh\omega t + \cosh\omega t\right\}\exp(-at)\right] \quad \text{i}$$

when $a^2 = b$ $$V_{RS} = E\left\{1 - \left(1 + at - \frac{DL}{r} bt\right)\exp(-at)\right\} \quad \text{ii}$$

when $a^2 < b$ $$V_{RS} = E\left[1 - \left\{\frac{1}{\omega}\left(a - \frac{DL}{r} b\right)\sin\omega t + \cos\omega t\right\}\exp(-at)\right], \quad \text{iii}$$

where $t_O$ is the period of time in which the loop including the low resistance is closed and t is time.

Figure 6A:
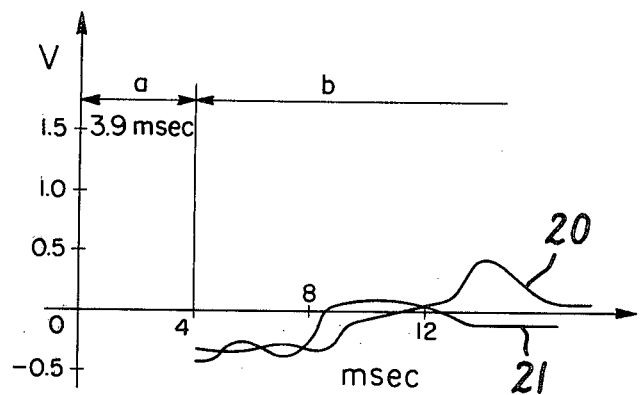
FIG. 6A shows voltage waveforms induced in the detection resistor in case the rotor rotates and does not rotate.
Figure 6B:
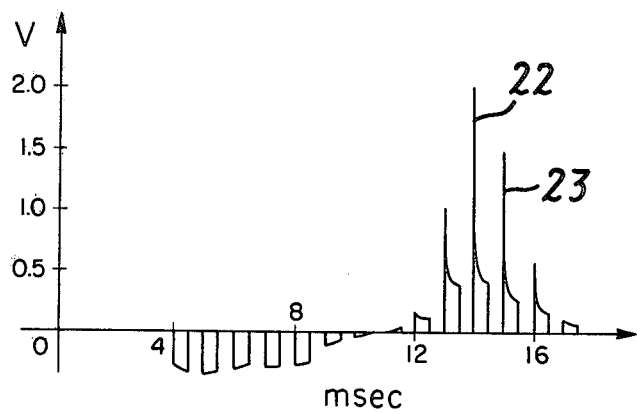
FIG. 6B shows voltage waveforms induced in the detection resistor when the loop including the high resistance and the loop including the low resistance are closed in case the rotor rotates and does not rotate.
Figure 6C:
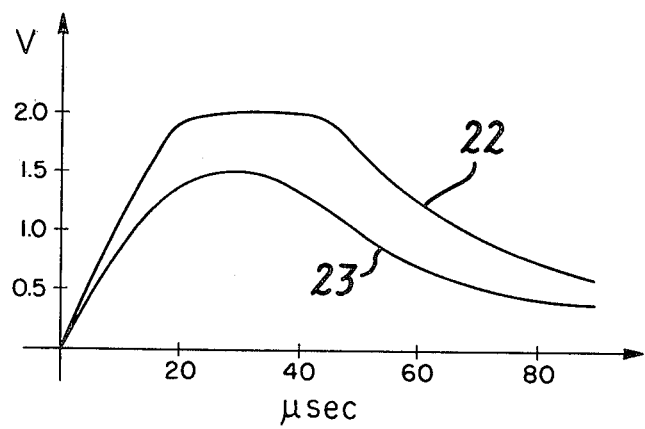
FIG. 6C shows an expanded view of the waveforms 22 and 23 in FIG. 6B.

The $V_{RS}$ waveform in the above equations is as shown in FIG. 6C.

Calculating $V_{RS}$ according to one embodiment, it takes about 30 msec for $V_{RS}$ to reach the peak voltage under the condition that L=11 henry, C=75 PF, R=150 KΩ, r=3.0 KΩ, $V_0$=0.1 V and $t_O = \infty$, and the peak voltage at this time is 4.2 V and the multiplying factor is about 42 times. This value shows that the detection signal is easily amplified without using an amplifier for amplifying the analogue signal.

In the above calculation, though the closed period of the loop including the low resistance is regarded as infinite, it is necessary to close the loop 10 and the loop 11 alternately since the developed voltage $V_O$ changes momentarily. As for the loop 10 including the high resistance, the time taken to recover the steady-state current is short since the time constant of the closed loop 10 is small, but as for the loop 11 including the low resistance, the time taken to recover the steady-state current is relatively long since the time constant of the closed loop 11 is large. In the above calculation, as for the loop 11 including the high resistance, $V_{RS}$ becomes the steady-state voltage in about 0.2 msec. However, as for the loop 10 including the low resistance, the time constant is found by $\tau = L/r$ and $\tau = 3.9$ msec and even if the low resistance loop 10 is continued for 3.9 msec, $V_{RS}$ is 63% of the steady-state voltage.

If the foregoing method is used for the detector of the external alternating magnetic field, it is better than the multiplying factor be large.

The alternating magnetic field that the timepiece is most likely to be subjected to is the commercial frequency of 50 Hz or 60 Hz and the period of which is respectively 20 msec or 16.7 msec. Accordingly, in order to detect the alternating magnetic field of the maximum strength of the commercial frequency, an optimum switching period exists.

Figure 18A:
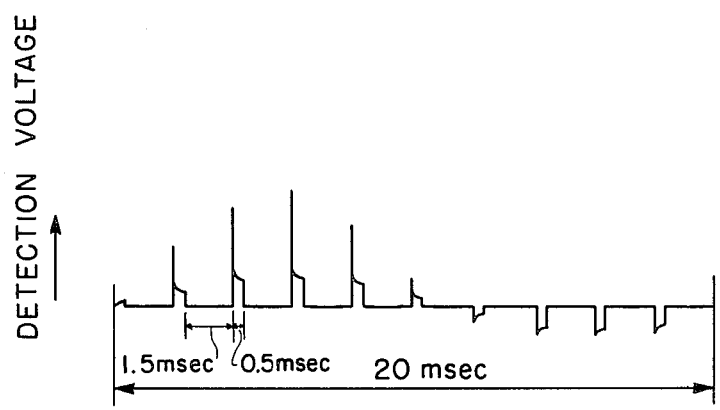
FIG. 18A is a detection voltage waveform chart in case the alternating magnetic field of 50 Hz is applied.

FIG. 18A shows a waveform of the detection voltage in the case where the alternating magnetic field of 50 Hz is applied under the condition that the loop 10 including the high resistance is closed for 0.5 msec and the loop 11 including the low resistance is closed for 1.5 msec. The multiplying factor of the detection signal on this occasion is about 15 times based on theoretical calculation.

Figure 18B:
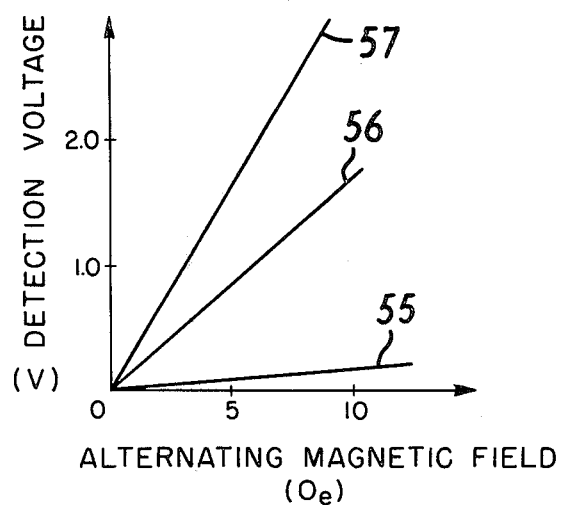
FIG. 18B is a characteristic diagram showing the relation between the strength of the alternating magnetic field and the detection voltage according to the present invention.

FIG. 18B shows the relation between the strength of the alternating magnetic field and the detection voltage, where a line 55 designates the voltage which develops in the coil when the loops are closed and a line 56 designates the voltage which develops in the coil in the case the loop 11 including the low resistance and the loop 10 including the high resistance are alternately closed at 0.5 msec intervals, and the multiplying factor is about 5 times.

Thus, in order to detect the alternating magnetic field at the commercial frequency of 50 Hz, the time at which the loop 10 including the high resistance and the loop 11 including the low resistance are alternately closed cannot be taken so long.

In this case, the multiplying factor can be increased by shortening the period to close the loop including the high resistance and by lengthening the period to close the loop including the low resistance according to this embodiment of the present invention.

Though the loop 10 including the high resistance and the loop 11 including the low resistance are alternately closed in the time ratio of 1:3 in this embodiment, it is more effective if the loops are alternately closed in the time ratio of 1:7 or 1:15.

As mentioned above, the detection sensitivity of the alternating magnetic field can be enhanced only by changing the switching pulse using the detection resistor and the reference voltage determined by the stepping motor, and thereby even an alternating magnetic field of low strength may be detected.

Accordingly, even if the stepping motor is subjected to the external alternating magnetic field, the stepping motor can be driven stably like the conventional type which uses the connection driving pulse as described heretofore. The present invention is realized only by the addition of a digital circuit which can be done without increasing the cost.

The present invention comprises a high impedance element, a voltage comparator and a reference voltage portion to detect whether the rotor rotates or does not rotate and whether the external alternating magnetic field exists or does not exist. The high impedance element is used to convert the current in the coil generated by the rotational vibration of the rotor and the external alternating magnetic field into the voltage at a fixed multiplying factor. The high impedance element consists of a diffusion resistance or a resistance of a conducting transistor to enable the high impedance element to be incorporated into an IC. And it goes without saying that the impedance element may be indefinite in impedance value.

In the present case, the diffusion resistance is formed by diffusion layers such as P+, P− and N+. If the ON resistance of the transistor is used, transistors 7a and 7b are used as they are in the circuit in FIG. 2 and thus it is not necessary to use the resistors 6a and 6b as the detection resistors.

According to the present invention, the detection sensitivity of the rotation detection and the magnetic field detection are set by the value of the high impedance element and the reference voltage.

FIG. 19 shows a relation between the detection resistance $R_S$ and the peak voltage value $V_{RS}$ which develops across the resistance according to the method in Embodiment (1), provided that the value of the diffusion resistance used as the high impedance element is $R_S$.

As for the stepping motor used in FIG. 19, the direct current resistance of the coil is 3 K$\Omega$ and the number of turns is 10000, and the rotor is made of samarium cobalt of 1.3 mm in diameter.

A reference voltage $V_{TH}$ 300 in FIG. 19 is set by dividing the supply voltage $V_{DD}$ by the resistance value of the resistors 85 and 86 in FIG. 11B. The rotation and non-rotation of the rotor and the existance of the external alternating magnetic field are detected on the basis of the reference voltage $V_{TH}$ 300.

A curve 301 shows the relation between the detection resistance $R_S$ and the maximum voltage $V_{RS}$ during the detection time interval in case the rotor is not rotated by the driving pulse PD$_1$. A curve 302 shows the relation between the detection resistance $R_S$ and the minimum value of the maximum voltage $V_{RS}$ during the detection time interval in case the rotor is rotated by the driving pulse PD$_1$.

Accordingly, it is possible to detect whether the rotor is rotated or not if the reference voltage including the tolerance is inside the portion surrounded by the curves 301 and 302 within the tolerance limits of the detection resistance $R_S$ incorporated into the IC.

A curve 303 shows the relation between the detection resistance $R_S$ and the voltage $V_{RS}$ developed across the detection resistance $R_S$ in case the frequency and the strength of the external alternating magnetic field are respectively 50 Hz and 3 oersteds.

It is difficult to reduce the detection resistance $R_S$ by the above mentioned relation between the detection resistance $R_S$ and the voltage $V_{RS}$ and the tolerance of the detection resistance in case the detection resistance is incorporated into the IC. Therefore the necessary tolerance of the detection resistance to be incorporated into the IC can be obtained by setting the value of the detection resistance more than 5 times as much as the coil resistance (in the embodiment more than 15 K$\Omega$ since the coil resistance is 3 K$\Omega$) generally.

In this embodiment in case the detection resistance $R_S$ is 100 K$\Omega$, −50% and +100% tolerance is enough.

FIG. 20A shows an embodiment of the voltage comparator as an element of the detection portion.

The performance requirements of the voltage comparator necessary for the present invention are as follows:

(1) The error in comparison with the reference voltage must be small.
(2) The voltage comparator must be easily made by the C-MOS-IC element.
(3) Response time must be quick.
(4) Current consumption must be small.

The voltage comparator in FIG. 20A meets the above requirements.

FIG. 20A and FIG. 20B respectively show the detailed circuit diagram and a block diagram of the voltage comparator. Terminals 164, 165 and 166 are respectively a "+" input terminal, a "−" input terminal and an output terminal. The function of the voltage comparator is shown in Table 2.

TABLE 2

| + input terminal | − input terminal | output terminal |
|---|---|---|
| V+ > V− | | "H" |
| V+ < V− | | "L" |

A power source terminal 167 is respectively connected to source electrodes of PMOSFETs 160 and 162.

The gate and drain electrodes of PMOSFET 160 are connected together and the connecting point 168 is connected respectively to the gate of PMOSFET 162 and the drain of NMOSFET 161.

The gate of NMOSFET 161 is connected to the terminal 164 and the source of the NMOSFET 161 is connected to the drain of NMOSFET 124.

The drain of PMOSFET 162 is connected to the drain of NMOSFET 163 and the output terminal 166. The gate of NMOSFET 163 is connected to the terminal 165 and the source of NMOSFET 163 is grounded to the $V_{SS}$ potential together with the source of NMOSFET 161. The characteristics of NMOSFETs 161, 163 and PMOSFETs 160, 162 are respectively equal.

Hereafter the operation of the voltage comparator of the above mentioned construction will be described. If an input voltage $V_1$ is applied to the terminal 164, the potential and current at the connecting point 168 will be as shown in FIG. 20C. In FIG. 20C, V168 is the potential of the terminal 168 and I168 is the current flowing through the terminal 168. Since V168 is applied to the gate of PMOSFET 162, the saturation current of PMOSFET 162 is equal to I168 as shown by the characteristic curve 162 in FIG. 20D. If the voltage applied to the terminal 165 is $V_2$, the saturation current of NMOSFET 163 is larger than I168 in case $V_2 > V_1$. Accordingly, the potential V166 of the output terminal 166 approaches the "L" level as shown by the operating point X in FIG. 20D. On the other hand, in case $V_2 < V_1$, the potential V166 of the output terminal is at the "H" level as shown by the operating point Y in FIG. 20D.

Moreover, according to the present invention, the circuit for detecting the alternating magnetic field and the rotation and non-rotation of the rotor is composed of elements easily incorporated into an IC, other than the stepping motor.

Particularly, the impedance element as the detection element can be composed of the diffusion resistance easily incorporated into the IC or composed of the ON resistance of the switching transistor or composed of the condenser. These elements are easily incorporated into the IC, and the tolerance of the elements can be widely set. Therefore, even if the detection circuit according to the present invention is incorporated into the conventional IC, the yield of manufacture of the IC is not diminished.

As illustrated above, if the conventional stepping motor is driven by the driving method according to the present invention, an output torque the same as the conventional type is obtained without increasing the cost and with half of the conventional current consumption, moreover, the alternating anti-magnetic characteristic is improved and the stepping motor becomes more tolerant to the surroundings.

Therefore, in case a timepiece of the same anti-magnetic characteristics and the same battery life as conventional timepieces is designed, the magnetic sealed structure is simplified and the battery occupies the minimum of space. Therefore the dimensions and the thickness of the timepiece can be reduced in accordance with the present invention.

We claim:

1. A device for use with an electronic timepiece and the like comprising: a stepping motor having a stator, rotor and driving coil; means for generating at least two kinds of driving pulses each effective when applied to the driving coil to rotationally drive the rotor under different operating conditions; means for detecting rotation and non-rotation of the rotor; means for detecting an external alternating magnetic field; and control means for selecting at least one kind of driving pulse for application to the driving coil in response to the detection of rotation and non-rotation of the rotor and the detection of an external alternating magnetic field.

2. A device according to claim 1 wherein at least one of said means for detecting rotation and non-rotation of the rotor and said means for detecting an external alternating magnetic field includes means for enhancing the detection sensitivity level; and wherein the detection sensitivity level of said means for detecting an external alternating magnetic field is higher than that of said means for detecting rotation and non-rotation of the rotor.

3. A device according to claim 2 wherein said means for enhancing the detection sensitivity level comprises a normally open low impedance loop comprised of said driving coil and a low impedance element, a normally open high impedance loop comprised of said driving coil and a high impedance element, and means for alternately switching between said low and high impedance loops to thereby alternately close said loops.

4. A device according to claim 3 wherein both of said detecting means include means for enhancing the detection sensitivity level comprised of said low impedance loop, high impedance loop and means for alternately switching between said low and high impedance loops; and wherein the means for alternately switching includes means for alternately switching between said low and high impedance loops such that the ratio of the period of time said low impedance loop is closed to the period of time said high impedance loop is closed during operation of said means for detecting an external alternating magnetic field is different from the ratio of the period of time said low impedance loop is closed to the period of time said high impedance loop is closed during operation of said means for detecting rotation and non-rotation of the rotor.

5. A device according to claim 3 wherein said high impedance element comprises a diffusion resistance formed in an integrated circuit.

6. A device according to claim 3 wherein said high impedance element comprises the resistance of a conducting transistor formed in an integrated circuit.

7. A device according to claim 6 wherein said means for detecting an external alternating magnetic field includes means for detecting the voltage induced in said driving coil by an external alternating magnetic field.

8. A device according to claim 6 wherein said control means includes means for selecting one kind of driving pulse in response to the detection of non-rotation of the rotor and for selecting another kind of driving pulse different from said one kind in response to the detection of an external alternating magnetic field.

9. In an electronic timepiece having a stepping motor comprised of a stator, rotor and driving coil: means for generating at least one kind of normal driving pulses, correction driving pulses having greater effective power than any of said normal driving pulses, and anti-magnetic driving pulses having greater effective power than said correction driving pulses; means for normally applying one of the normal driving pulses to the driving coil in successive predetermined time periods to effect rotation of the rotor; first detecting means operable during each predetermined time period for detecting rotation and non-rotation of the rotor after the application of one normal driving pulse to the driving coil; second detecting means operable during each predetermined time period for detecting the presence of an external alternating magnetic field before the application of one normal driving pulse to the driving coil; and control means responsive to the detection of non-rotation of the rotor by said first detecting means for effecting the application of a correction driving pulse to the driving coil within the same predetermined time period in which the non-rotation was detected to thereby effect rotor rotation and responsive to the detection of an external alternating magnetic field by said second detecting means for effecting the application of an anti-magnetic driving pulse to the driving coil within the same predetermined time period in which the external alternating magnetic field was detected to thereby effect rotor rotation.

10. An electronic timepiece according to claim 9 wherein said anti-magnetic driving pulses have a longer pulse width than said correction driving pulses.

11. An electronic timepiece according to claim 9 further including means for inhibiting said first detecting means in response to the detection of an external alternating magnetic field by said second detecting means.

12. An electronic timepiece according to claim 9 wherein at least one of said first and second detecting means includes means for enhancing the detection sensitivity level; and wherein the detection sensitivity level of said second detecting means for detecting an external alternating magnetic field is higher than that of said first detecting means for detecting rotation and non-rotation of the rotor.

13. An electronic timepiece according to claim 12 wherein said means for enhancing the detection sensitivity level comprises a normally open low impedance loop comprised of said driving coil and a low impedance element, a normally open high impedance loop comprised of said driving coil and a high impedance element, and means for alternately switching between said low and high impedance loops to thereby alternately close said loops.

14. An electronic timepiece according to claim 13 wherein both of said first and second detecting means include means for enhancing the detection sensitivity level comprised of said low impedance loop, high impedance loop and means for alternately switching between said low and high impedance loops; and wherein the means for alternately switching includes means for alternately switching between said low and high impedance loops such that the ratio of the period of time said low impedance loop is closed to the period of time said high impedance loop is closed during operation of said second detecting means is different from the ratio of the period of time said low impedance loop is closed to the period of time said high impedance loop is closed during operation of said first detecting means.

15. An electronic timepiece according to claim 13 wherein said high impedance element comprises a diffusion resistance formed in an integrated circuit.

16. An electronic timepiece according to claim 13 wherein said high impedance element comprises the resistance of a conducting transistor formed in an integrated circuit.

17. An electronic timepiece according to claim 9 wherein said second detecting means for detecting an external alternating magnetic field includes means for detecting the voltage induced in said driving coil by an external alternating magnetic field.

* * * * *